Sept. 11, 1934.  F. H. LE JEUNE  1,973,173
WHEEL COUNTERBALANCE
Filed July 29, 1929

Inventor
Frank H. Le Jeune
By Blackmore, Spencer & Flint
Attorneys

Patented Sept. 11, 1934

1,973,173

UNITED STATES PATENT OFFICE 1,973,173

WHEEL COUNTERBALANCE

Frank H. Le Jeune, Jackson, Mich., assignor, by mesne assignments, to Kelsey-Hayes Wheel Corporation, a corporation of New York Application July 29, 1929, Serial No. 381,723

6 Claims. (Cl. 301—5)

This invention relates to wheels and has particular reference to the counterbalancing of automobile wheels which are usually equipped with a rim and tire.

One of the principal objects of the present invention resides in the provision of counterbalancing means for vehicle wheels enabling the latter to be accurately balanced after the tire is assembled therewith.

Another advantageous feature of this invention resides in securing the counterbalancing means to the wheel in such a manner that this means is concealed from view. In the specific embodiment of the invention trial weights are assembled in suitable openings formed in the felly of the wheel until the latter is in accurate balance whereupon permanent weights are substituted for the trial weights.

A further advantageous feature of this invention resides in the novel means for securing the permanent weights to the wheel and this feature as well as the foregoing objects will be made more apparent as this description proceeds, especially when considered in connection with the accompanying drawing, wherein:—

Figure 2:
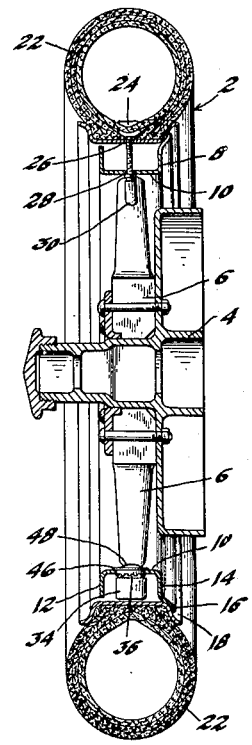
Fig. 2 is a section on the line 2—2 of Fig. 1.
Figure 3:
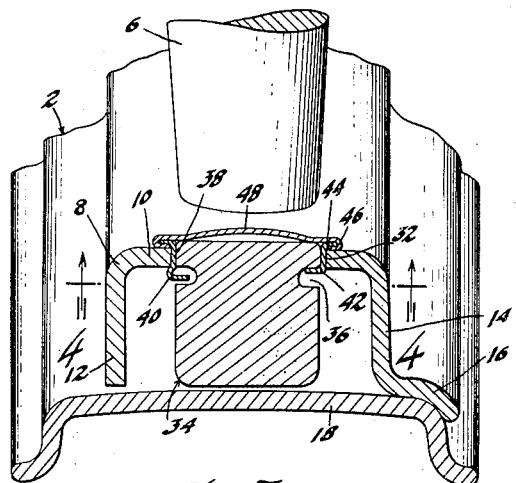
Fig. 3 is an enlarged detailed sectional view of the lower portion of the wheel on the line 2—2 of Fig. 1.
Figure 4:
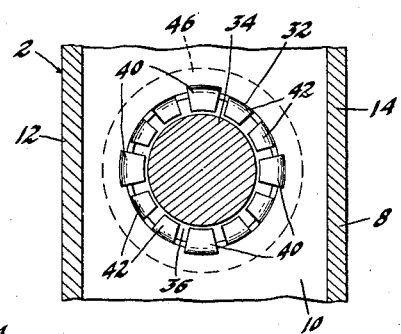
Fig. 4 is a sectional view on the line 4—4 of Fig. 3.

Referring to the drawing, 2 indicates a wheel as a whole. The wheel includes the hub 4, spokes 6 and felly 8. The felly is channel shaped as shown in Figs. 2 and 3 and includes the base 10 and sides 12 and 14. The side 14 is provided with the flange 16 adapted to receive one side of the rim 18. The opposite side of rim 18 is secured to the felly by means of the usual lugs 20.

Figure 1:
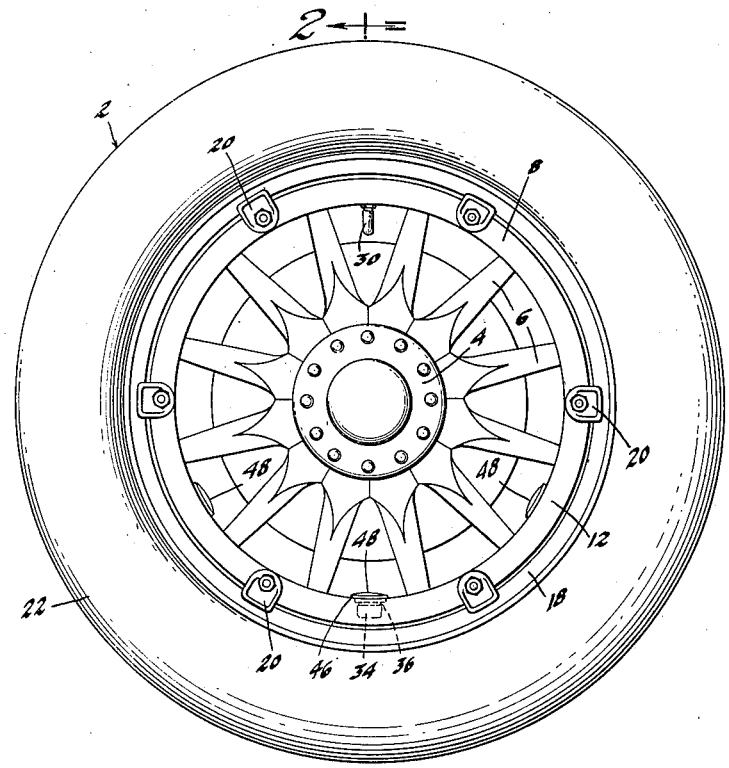
Fig. 1 shows a side view of an automotive vehicle wheel with the invention applied.

The tire is shown at 22 and is provided with the usual valve 24. The valve 24 passes through openings 26 and 28 in the rim and felly respectively and projects interiorly toward the hub as shown at 30 in Fig. 1.

The openings 26 and 28 and the valve 24 together with the variations in symmetry of the tire and inaccuracies of workmanship in the shaping of the spokes 6 will put the wheel out of balance and it is the purpose of the structure now to be described to again place the wheel in balance.

In the base 10 of the channel 8 there is provided a plurality of openings, one of which is shown at 32 in Fig. 3. As many openings as desired may be provided. When the wheel is tested for balance and the area or point at which the lightest portion of the wheel is found, there is placed in one of the openings 32 nearest the area or point a weight indicated at 34. This weight comprises one single piece and insofar as its mass is concerned it will be of a size to compensate for the lack of balance of the wheel.

Sometimes it will be found necessary to place weights at different points about the wheel, in which case the correct weights are placed in the holes provided. The holes not used for weights are merely closed with a cap 48 and snap ring 38 without a weight.

By referring to Fig. 3 it will be seen that the weight projects into the channel of the felly 8 and is provided with a groove 36 at the inner end thereof. The outer dimension of the weight is such as to cause it to easily fit within the opening 32 and to enable a ring or clip 38 to be received in the opening between the end of the weight and the base 10 of the channel. The purpose of this ring or clip 38 is to secure the weight 34 rigidly to the felly 8.

On the channel side of the felly the ring or clip 38 is provided with teeth or flanges 40 and 42. The purpose of the teeth 42 is to grip into the groove 36 of the weight as shown at the right of Fig. 3, while the function of the teeth or flanges 40 is to grip the base 10 inside the channel as shown at the left of Fig. 3. At the inner periphery of the felly 8 the rim or clip 38 is provided with the annular flange 44 which is received within the bent over portion 46 of a cap 48. The cap 48 and ring 38 are rigidly held together by means of the flange 44 and bent portion 46. To insert the weight in the opening 32, force is applied to cause the flanges or teeth 40 to spring inwardly in the grooves 36 and after they have passed the edge of the opening 32 they will spring outwardly as shown at the left of Fig. 2 to rigidly hold the weight in place.

If one weight 34 is insufficient to obtain proper counterbalance, two or more weights may be applied to two or more openings as is found necessary.

In the present invention it is to be observed that the weight 34 is composed of a single piece of metal and projects inwardly of the channel of the felly 8 and has its innermost portion substantially flush with the inner periphery of the base 10 of the felly. The cap 48 will project but slightly beyond the periphery and serve to conceal the ring 38 and the weight. By having the weight project inwardly it avoids the usual unsightly appearance of projecting parts and in addition eliminates the projecting parts which serve to catch mud and dirt from the roadway.

I claim:

1. In a wheel including a channel shaped felly having an opening therein, a weight in said opening, a groove in said weight, and a clip at said opening having a portion fitting into said groove to secure said weight to said felly.

2. In a wheel including a channel shaped felly having an opening, a counterbalancing weight in said opening, a groove on said weight, and a clip engaging in the groove and on the felly at the edge of the opening to rigidly hold said weight to said felly.

3. In a wheel including a channel shaped felly having an opening, a counterbalancing weight in said opening, a groove on said weight, a clip engaging in the groove and on the felly at the edge of the opening to rigidly hold said weight to said felly, and a cap fitting over said clip to conceal clip and weight.

4. In a wheel including a channel shaped felly having an opening, a counter-balancing weight in said opening, a groove on said weight, and a clip engaging in the groove and on the felly on both inner and outer sides of the opening to rigidly hold said weight to said felly.

5. In a wheel including a channel shaped felly having an opening, a counter-balancing weight in said opening, a groove on said weight, a clip engaging in the groove and on the felly on both inner and outer sides of the opening to rigidly hold said weight to said felly, and a cap fitting over said clip to conceal said clip and weight.

6. A vehicle wheel having a felly member provided with a base portion formed with an opening therethrough, a weight extending into said opening, a clip having fingers insertable into the opening in gripping relation to the weight for securing the latter to the clip and certain of said fingers fashioned to snap into engagement with the marginal edges of the opening to detachably secure the weight to the rim member.

FRANK H. LE JEUNE.